(12) United States Patent
Egner et al.

(10) Patent No.: US 10,125,032 B2
(45) Date of Patent: Nov. 13, 2018

(54) DEVICE FOR THE PHOTOCHEMICAL TREATMENT OR CLEANING OF A LIQUID MEDIUM

(71) Applicant: SICO Technology GmbH, Bad Bleiberg (AT)

(72) Inventors: Siegfried Egner, Adelsheim (DE); Bentsian Elkin, Filderstadt (DE); Jorge Toro Santamaria, Stuttgart (DE); Walter Nadrag, Bleiberg (AT)

(73) Assignee: SICO Technology GmbH, Bad Bleiberg (AT)

( * ) Notice: Subject to any disclaimer, the term of this patent is extended or adjusted under 35 U.S.C. 154(b) by 0 days.

(21) Appl. No.: 15/306,325

(22) PCT Filed: Apr. 20, 2015

(86) PCT No.: PCT/EP2015/058508
§ 371 (c)(1),
(2) Date: Oct. 24, 2016

(87) PCT Pub. No.: WO2015/162089
PCT Pub. Date: Oct. 29, 2015

(65) Prior Publication Data
US 2017/0044026 A1    Feb. 16, 2017

(30) Foreign Application Priority Data

Apr. 24, 2014  (DE) .................. 10 2014 207 690

(51) Int. Cl.
*C02F 1/32* (2006.01)
*H01J 61/16* (2006.01)
*H01J 65/04* (2006.01)

(52) U.S. Cl.
CPC .............. *C02F 1/325* (2013.01); *H01J 61/16* (2013.01); *H01J 65/042* (2013.01);
(Continued)

(58) Field of Classification Search
None
See application file for complete search history.

(56) References Cited

U.S. PATENT DOCUMENTS

| 5,395,522 A | 3/1995 | Melanson et al. |
| 8,475,725 B1 | 7/2013 | Antipenko et al. |

(Continued)

FOREIGN PATENT DOCUMENTS

| CA | 2576411 | 2/1999 | |
| CA | 2576411 A1 * | 12/1999 | .............. C02F 1/325 |

(Continued)

OTHER PUBLICATIONS

DE19507189A1 English Language Abstract (1 page).
(Continued)

*Primary Examiner* — Andrew Smyth
(74) *Attorney, Agent, or Firm* — Ware, Fressola, Maguire & Barber LLP

(57) ABSTRACT

The present invention concerns a device (10) for the photochemical treatment of a liquid medium, the device (10) having at least one flow channel (16a, 16b) for the liquid medium to pass through, said flow channel being delimited at least in sections by a UV-light-emitting surface (14) of at least one UV-light-producing body (12). The at least one UV-light-producing body (12) is designed such that the passing liquid medium can be electrically contacted and replaces at least one electrode for producing the UV light in the device (10).

14 Claims, 3 Drawing Sheets

Figure 1:
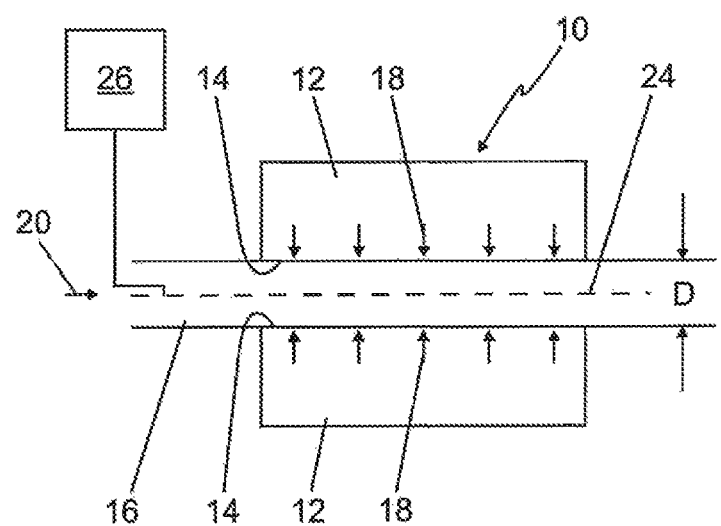

(52) U.S. Cl.
CPC .... *H01J 65/046* (2013.01); *C02F 2201/3225* (2013.01); *C02F 2201/3227* (2013.01)

(56) References Cited

U.S. PATENT DOCUMENTS

| | | | |
|---|---|---|---|
| 2004/0025597 A1 * | 2/2004 | Ericson | A61M 5/16804 |
| | | | 73/861.52 |
| 2008/0185536 A1 | 8/2008 | Schiene et al. | |
| 2008/0292497 A1 | 11/2008 | Vangeneugden et al. | |

FOREIGN PATENT DOCUMENTS

| | | | | |
|---|---|---|---|---|
| CA | 2576411 C | * | 1/2009 | ............ C02F 1/325 |
| DE | 19507189 A1 | | 9/1996 | |
| DE | 19919169 A1 | | 11/2000 | |
| DE | 102006022970 B3 | | 11/2007 | |
| DE | 102009025667 A1 | | 12/2010 | |
| EP | 0458140 A1 | | 11/1991 | |
| EP | 0697374 A1 | | 2/1996 | |
| JP | 2004146077 | | 5/2004 | |

OTHER PUBLICATIONS

DE19919169A1 English Language Abstract (1 page).
JP2004146077A English Language Abstract (1 page).
EP0697374A1 English Language Abstract (1 page).

* cited by examiner

DEVICE FOR THE PHOTOCHEMICAL TREATMENT OR CLEANING OF A LIQUID MEDIUM

The present invention relates to a device for the photochemical treatment of a liquid medium according to the general concept of claim 1. The invention is used, in particular, for the photochemical cleaning of contaminated water.

PRIOR ART

From DE 10 2006 022 970 B3, for example, the production of UV light (wavelength of approx. 100 to 400 nm) by excitation of gases or gas mixtures with high-frequency electromagnetic waves—in particular, microwaves—is known. The device produces UV light, which is emitted planarly.

From EP 0 458 140 A1, an excimer radiator is known, which emits electromagnetic radiation in the UV-wavelength range.

A lamp known from DE 10 2009 025 667 A1 functions similarly to a fluorescent tube filled with gas. By means of a suitable excitation (e.g., by high-energy electrons) of the molecules of this gas, one or more electrons of the molecules contained in the gas are raised to a higher-energy electron orbit. As soon as these electrons return to the original electron orbit, energy is released, which is emitted in the form of light—in particular, UV light.

From DE 195 07 189 A1, an excimer radiator for the treatment of contaminated liquids is known. This excimer radiator comprises two electrodes, one of which is in contact with the liquid to be cleaned. Both electrodes are arranged on a radiation bulb.

These discharge lamps are sufficiently known and have proven themselves in practice. A particular advantage of such ionization radiators with a gas that contains, for example, mercury or compounds thereof is that a large portion of the light emitted, e.g., in the case of mercury, has a wavelength of approximately 254 nm and can effectively produce this light with high efficiency.

It is further known from EP 0 458 140 that inert gases such as xenon, instead of mercury, may be used in discharge lamps. Xenon emits UV light with a wavelength of approximately 172 nm, which is even higher in energy than light emitted by mercury. The xenon UV light is, for example, used to roughen surfaces in industrial production engineering. It is also known that the high-energy xenon UV light can be used to clean waste water. The xenon UV light separates a so-called hydroxyl radical from $H_2O$. This hydroxyl radical can be used to decompose contaminants in waste water.

In this way, the UV light sent is used, as is known, to treat contaminated water, e.g., in waste water purification plants, process water treatment plants, and drinking water treatment plants, or to bring about chemical reactions, such as syntheses, in photoreactors. For these applications in particular, a variety of UV-light sources is generally required, which are operated at the same time continuously over many hours.

The invention is based upon the aim of creating a device for the photochemical treatment of a liquid medium—in particular, for the photochemical cleaning of contaminated water—which device has a simple structure and can therefore be produced and operated cost-effectively.

The aim is achieved according to the invention in that the at least one UV-light-producing body is designed such that the passing liquid medium can be electrically contacted and replaces at least one electrode for producing the UV light in the device. In this case, the liquid medium need not necessarily be electrically conductive, since, in a pulsed and/or high-frequency excitation of the electrical discharge, a capacitive decoupling by a layer of the dielectric (in this case, the liquid medium) is also completely sufficient.

The UV-light-producing body otherwise functions in the device according to the invention as in a gas discharge lamp.

The second electrode for operating the UV-light-producing body can be metallic and is arranged in or on the UV-light-producing body and electrically contacted there.

Alternatively, the second electrode can be coupled in analogously to the first electrode via the medium to be treated.

One embodiment provides that a power supply for the contactable liquid medium be realized by a grid arranged in the liquid medium in the region of the UV-light-producing body. In doing so, the high-frequency and/or pulsed electric voltage required for the operation of the UV lamp is applied to the grid.

The power supply implemented as a grid can at the same time cause a desired turbulence of the contaminated water, in order to achieve a good (cross) mixing of the water in the flow channel. This is desired in order that the largest possible portions of the water pass the light-emitting surface of the UV-light-producing body in close proximity. Only in close proximity to the light-emitting surface are the desired hydroxyl radicals formed. Other arrangements for swirling the water flowing through the flow channel (for example, guide vanes, shoulders, elevations, webs, etc.) are possible alternatively, or even additionally.

An alternative embodiment can provide that a power supply for the contactable liquid medium be realized by an electrically conducting wall of the at least one UV-light-producing body, wherein the high-frequency and/or pulsed electric voltage required for the operation of the UV lamp is applied to the wall.

Another alternative embodiment can provide that a power supply for the contactable liquid medium be realized by an electrically conducting light-emitting surface of the at least one UV-light-producing body, said light-emitting surface being arranged towards the liquid medium. In doing so, the light-emitting surface can, for example, be made of a material that is semi-transparent to the produced UV radiation, wherein the material is electrically contactable and electrically conducting. The electric voltage required for the operation of the UV-light-producing body is in this case applied to the semi-transparent material.

The advantage of the electrical contacting of the liquid medium is particularly great if the UV-light-producing body comprises light-emitting surfaces on both sides. The direct contact of the liquid medium with the UV-light-producing body on both sides has so far not been taken into consideration, since the application of high voltage to water-conducting components was viewed as an insurmountable obstacle. Safety is always ensured in the device according to the invention.

The contact on both sides with the liquid medium has, however, the advantages of a better utilization of the radiation and of a better cooling of the UV-light-producing body.

The following measures or designs can also be provided in the device according to the invention:

It can, for example, be provided that the water connection lines connected to the operating voltage-carrying side of the UV-light-producing body be electrically insulated from the rest of the device, or at least have a high impedance. On the one hand, this ensures that the electrical energy acts in the UV-light-producing body and is not discharged to the outside. On the other hand, at least a major portion of the device can then be grounded, in order to satisfy the safety requirements.

An insulation or a high impedance can be achieved through various technical measures. Some possible embodiments are described in more detail below.

It can also be provided in the device according to the invention that the at least one UV-light-producing body be supplied by a transformer with a grounded center, so that half of the total voltage is applied respectively to each electrode. The respective electric voltage can thus be easily cut in half relative to ground on each electrode, without reducing the total voltage at the UV lamp. By halving the voltage relative to ground, any losses in the connection lines are reduced, and the requirements for the high-voltage insulation of the connection lines are also reduced. Alternatively, a similar effect, i.e., bipolar output voltage, can be achieved with a transformerless output of the power supply, e.g., by using a full bridge.

Let's take as an example a UV-light-producing body with 200 W active electrical power, which is excited with bipolar pulses with a pulse length of 2 µs per impulse in each polarity (i.e., 4 µs per bipolar pulse) with a frequency of 50 kHz (i.e., a period of 20 µs). The voltage amplitude is 4 kV.

The electrical connection is made using a transformer that is grounded at the center of the secondary coil, so that only half of the voltage amplitude relative to ground, i.e., 2 kV, is applied to each electrode.

Proceeding from this example, it is shown that the use of sufficiently long connection lines made of insulating material, such as plastic pipes or rubber tubes, ensures a sufficient electrical insulation.

A voltage of 2 kV relative to ground is applied to the two water electrodes (in opposite polarities) during the impulse. For example, the fluidic supply or discharge lines, i.e., the parts of the flow channel in front of and behind the UV-light-producing body, have a cross-section of 1 cm² and a length of 2 m each. The end of each connection line that faces away from the UV-light-producing body is grounded. All pumps, valves, measuring devices, buffer volumes, etc., can thus be located in the grounded region.

Let's assume that the medium is very hard water with a correspondingly high electrical conductivity of approx. 1 mS/cm. This amounts to an electrical resistance of approx. 200 kOhm per line, corresponding to a peak value of the current of 10 mA, a peak value of the power of 20 W, and an average power of below 4 W. With four water lines or flow channels connected in parallel, this results in a power loss of below 16 W, which amounts to less than 10% of the electrical lamp wattage and is quite acceptable.

In another embodiment, the high electrical impedance is realized by an inductance (e.g., an inductor), wherein the inductance is realized by a connection line wound around a magnet core. In this way, even in case of a strongly electrically conducting medium (e.g., salt water), a high impedance (high resistance) can be achieved between the electrode of the UV-light-producing body and the ground.

Let's assume, for example, that the magnetic core of the inductor has an effective cross-section of approx. 20 cm², an effective length of 40 cm, and a magnetic permeability in the relevant frequency range of 5000.

The coil comprises 20 windings made of tubing. The inductance of the inductor is approx. 12 mH. With a bipolar pulse of 4 µs, the largest spectral portion of energy is at a frequency of 250 kHz. The inductor impedance at this frequency is approx. 180 kOhm—similar to the ohmic resistance in the previous example. Due to the predominantly inductive character of the impedance, the majority of the electrical power in this branch of the circuit is reactive, i.e., the losses are going to be even lower.

Another embodiment can, for example, provide that the high electrical resistance be realized by at least one dielectric interruption in the connection line, such as an air gap. In such a case, the connection line can be electrically conducting. In doing so, the dielectric interruption can, for example, be integrated into a joint for connecting the connection line to the device according to the invention.

Alternatively or additionally, it is also possible that the high electrical resistance or dielectric interruption is realized by a pump, such as a gear pump, peristaltic pump, or piston pump, arranged in the connection line. In many designs of fluid pumps, the return flow of the medium is blocked by means of mechanical devices, such as by gears in a gear pump, by valves and pistons in a piston pump, or by pinched-off tube sections of a peristaltic pump. If these pumps comprise a dielectric material in the flow range of the liquid medium, they will also exhibit the (additional) function of a dielectric interruption. A peristaltic pump can, for example, comprise the best electrical insulation.

It can further be provided that the end of the connection line that faces away from the UV-light-producing body comprise a grounding and/or that a side of the UV-light-producing body be grounded. The grounding serves to safely operate the UV-light-producing body. Parasitic currents should be discharged safely and parasitic electrical couplings should be avoided. Furthermore, in the event of an error, the grounding can protect individuals and animals from high contact voltages.

Alternatively, it can also be provided that all the vessels, such as a storage vessel and a collecting vessel, as well as all the associated connection lines, pumps, measuring devices, etc., be insulated from ground, wherein they are thus approximately at the electrical potential of the connected electrode.

Figure 2:
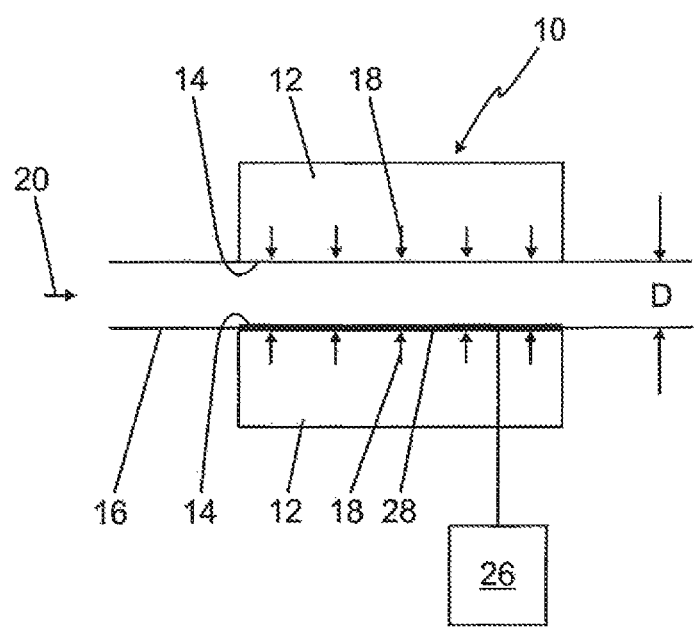
Figure 3:
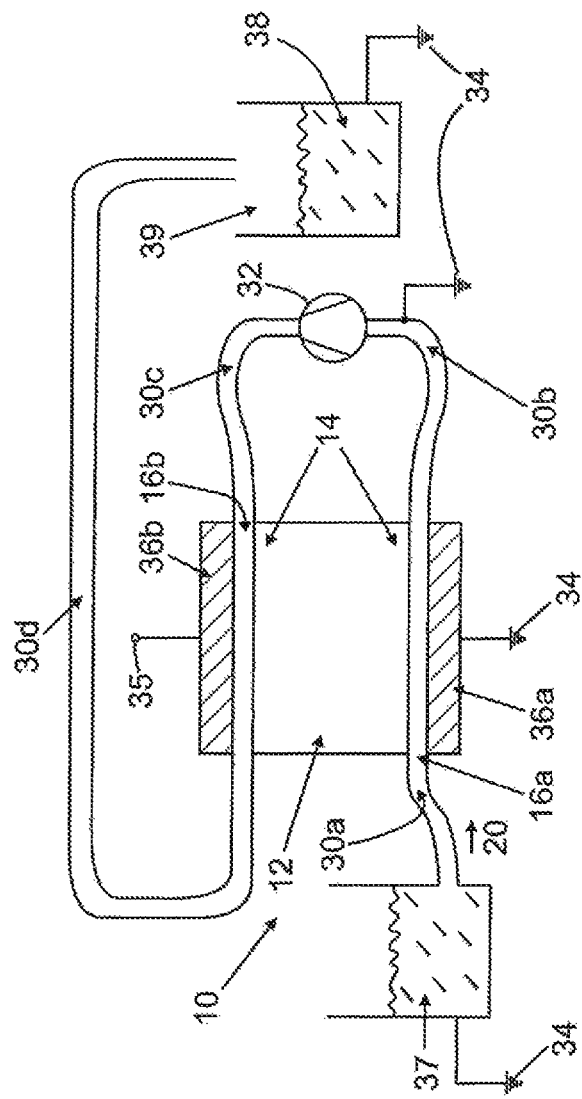

Exemplary embodiments of the invention are illustrated in the figures and are explained in more detail in the following description. Illustrated, in each case in schematic form, are:

FIG. 1 a device according to the invention for the photochemical treatment of a liquid medium in a first embodiment;

FIG. 2 the device according to the invention in a second embodiment;

FIG. 3 the device according to the invention in a possible environment.

FIG. 1 shows a device 10 according to the invention for the treatment or cleaning of a liquid medium in a lateral view in a first embodiment. The liquid medium is preferably contaminated water.

The device 10 of FIG. 1 comprises two UV-light-producing bodies or lamps 12, which, with their UV-light-emitting surface 14, form a region of a flow channel 16 for contaminated water. Naturally, more than two UV-light-producing bodies 12 can also be arranged with their light-emitting surfaces 14 one after the other. The light emission of the UV light from the light-emitting surface 14 is illustrated by arrows 18. A flow direction of the contaminated water is indicated by an arrow 20.

The UV-light-producing body 12 can be flat, cubical, round, oval, or annular; preferably, the UV-light-producing body 12 is designed as a flat cuboid. What is important is that its UV-light-emitting surface 14 delimits the flow channel 16 and directly forms at least a region of a wall of the flow channel 16. Thereby, the contaminated water can directly pass the UV-light-emitting surface 14.

The UV-light-producing body 12 can comprise amplification supports (not shown) in the internal space. This serves for greater stability of the UV-light-producing body 12.

The UV-light-producing body 12 comprises, preferably, xenon as filling gas and functions according to the known principle of gas discharge, wherein a dielectric barrier discharge (DBD) preferably occurs as a result of an excitation of the xenon gas with a high-frequency and/or pulsed electrical voltage, and a UV light with a wavelength of approx. 172 nm is thereby produced.

In principle, other inert gases, such as helium, argon, krypton, or neon can also be used. Also possible in this case are mixtures of several inert gases and/or mixtures with appropriate halogens, such as fluorine, chlorine, bromine, or iodine. What is important is that light with a wavelength of less than 185 nm is produced, because this light is very high-energy and allows for a photolysis of the water. The contaminants contained in the water are thereby oxidized into harmless substances.

The flow channel 16 is preferably rectangular. It could, however, also have an arbitrarily different cross-section, wherein the shape of the lamp 12 must be adapted to the cross-section in sections, in order to avoid a loss of energy by circulating contaminated water.

The illustrations in the figures are, for better clarity, not drawn to scale. A preferred thickness D of the flow channel 16 is approx. 1 mm; the width is essentially arbitrary. 10 cm have proven to be the upper limit for the thickness D of the flow channel 16. Better cleaning results arise with thicknesses of less than 5 cm, and preferably less than 1 cm.

Inside the flow channel 16, a metallic grid 24 is arranged parallel to the light-emitting surfaces 14. The grid 24 can be a wire grid made of thin, stainless steel wires. The grid 24 is electrically contacted, and suitable electrical impulses are applied to it by a pulse generator 26.

The grid 24 is used to electrically contact the contaminated water flowing through the flow channel 16, so that the flowing water forms an electrode for operating the UV-light-producing body 12. In the process, the electrical signals that the UV-light-producing body 12 requires for its operation are applied to the grid 24 by the pulse generator 26. The counter electrode can be arranged inside or outside of the UV-light-producing body 12 and is not shown.

FIG. 1 shows a (first) electrical connection 35 of the grid. The housings of the UV-light-producing body 12 can be grounded (see reference symbol 34) and can form a second electrical connection.

A second electrode for operating the UV-light-producing body 12 can also be formed metallically and then be arranged in or on the UV-light-producing body 12 and electrically contacted there.

FIG. 2 shows the device 10 according to the invention for the treatment or cleaning of contaminated water in a lateral view in a second embodiment. In contrast to the first embodiment, the light-emitting surface 14 of the UV-light-producing body 12 is electrically contacted in the second embodiment. For this purpose, the light-emitting surface 14 is designed to be electrically conducting. In this case, the light-emitting surface 14 can be made, for example, of a material 28 that is semi-transparent to the produced UV radiation, wherein the material 28 is electrically contactable and electrically conducting. In the process, the electrical signals that the UV-light-producing body 12 requires for its operation are applied to the semi-transparent material 28 by the pulse generator 26.

FIG. 3 shows another embodiment of the device 10 according to the invention in a possible environment. On the UV-light-producing body 12 designed as a flat cuboid, flow channels 16a and 16b are formed on both sides directly on the respective light-emitting surfaces 14. Each flow channel 16a and 16b is delimited on a first side by a metallic wall 36a and 36b and on the second, opposite side by the light-emitting surface 14 of the UV-light-producing body 12. Each metallic wall 36a and 36b is used at the same time as an electrode as well. The electrode 36a is grounded (see reference symbol 34), whereas the operating voltage for the UV-light-producing body 12 is applied to the electrode 36b via the electrical connection 35.

The flow channel 16a is connected to a storage container 37 via a connection line 30a. The flow channel 16b is connected to a collecting container 38 via a connection line 30d. Furthermore, the flow channels 16a and 16b are connected to one another via additional connection lines 30b and 30c via a pump 32, such as a peristaltic pump. The water is thus first pumped from the storage container 37 via the grounded flow channel 16a. Subsequently, the water is pumped through the connection lines 30b and 30c into the flow channel 16b, to which the high operating voltage of the UV-light-producing body 12 is applied. Afterwards, the treated water is collected in the collecting container 38 via the connection line 30d. Both containers 37 and 38 are grounded (see, in each case, reference symbol 34).

In the operating state, an electrical insulation is ensured between the voltage-carrying connection line 30d and the grounded collecting container 38 via the air gap 39. An electrical insulation between the voltage-carrying connection line 30c and the grounded line 30b is ensured by the peristaltic pump 32, which comprises components that are dielectrically acting (electrically insulating) in the flow range.

The groundings 34 serve to safely operate the UV-light-producing body 12. Parasitic currents should be discharged safely and parasitic electrical couplings should be avoided.

The research work that led to these results was supported by the European Union.

The invention claimed is:

1. A device for the photochemical treatment of a liquid medium, comprising:
    at least a first flow channel and a second flow channel for the liquid medium to pass through, said first and second flow channels being delimited at least in sections by a UV-light-emitting surface of at least one UV-light-producing body,
    wherein each of said first flow channel and said second flow channel are delimited on a first side by a first and second metallic wall, respectively, and on a second, opposite side by the UV-light-emitting surface of the at least one UV-light-producing body,
    wherein the liquid medium flows through the first flow channel, passes through a pump connecting the first flow channel and second flow channel, and flows through the second flow channel,
    wherein the metallic walls are used as electrodes, including a first electrode and a second electrode, wherein the first electrode is grounded and the operating voltage for the at least one UV-light-producing body is applied to the second electrode via an electrical connection, and
    wherein the liquid medium is contacted in each of the first and second flow channels directly or capacitively and during operation of the device, a potential difference is applied between the first and second flow channels, and the electrical energy is coupled into plasma of the at least one UV-light-producing body by this voltage, whereby the plasma is ignited or maintained.

2. The device according to claim 1, characterized in that a power supply for the contactable liquid medium is realized by a grid arranged in the liquid medium in the region of the at least one UV-light-producing body.

3. The device according to claim 1, characterized in that at least one circuit of the liquid medium is electrically insulated from ground during operation of the at least one UV-light-producing body, said circuit being connected to an electrode.

4. The device according to claim 1, characterized in that a power supply for the contactable liquid medium is realized by an electrically conducting wall of the at least one UV-light-producing body.

5. The device according to claim 1, characterized in that a power supply for the contactable liquid medium is realized by an electrically conducting light-emitting surface of the at least one UV light-producing body, said light-emitting surface being arranged towards the liquid medium.

6. The device according to claim 1, characterized in that at least one connection line for the liquid medium flowing through the device is electrically insulated from grounded system components or that the connection line itself has a high electrical impedance.

7. The device according to claim 6, characterized in that the high electrical impedance is realized by the use of sufficiently long connection lines made of electrically insulating materials.

8. The device according to claim 7, characterized in that the high electrical impedance is realized by at least one dielectric interruption in the connection line.

9. The device according to claim 6, characterized in that electrical insulation or the high electrical impedance is realized by insulating materials of a gear pump, peristaltic pump, or piston pump, said insulating materials being arranged in the connection line.

10. The device according to claim 6, characterized in that the high electrical impedance is realized by an inductance, wherein the inductance is realized by a connection line wound around a magnet core.

11. The device according to claim 1, characterized in that the at least one UV-light-producing body is supplied by a bipolar electric voltage, so that only a portion of a total voltage relative to ground is respectively applied to each of the first and second electrodes.

12. The device according to claim 11, characterized in that the bipolar voltage is produced by a transformer with a grounded center.

13. The device according to claim 11, characterized in that the bipolar voltage is produced by a bridge circuit—preferably, by a full bridge.

14. The device according to claim 1, characterized in that an end of a connection line comprises a grounding, said end facing away from the at least one UV-light-producing body.

* * * * *